FIG./.

United States Patent Office 3,372,234
Patented Mar. 5, 1968

3,372,234
PULSE SIGNAL DEMODULATOR WITH JUDGEMENT LEVEL PRODUCING AND COMPARISON MEANS
Edward Albert Henry Bowsher, Romford, and Kenneth George Perkins, Cranham, England, assignors to Plessey-UK Limited, a company of Great Britain
Filed Feb. 10, 1964, Ser. No. 343,899
Claims priority, application Great Britain, Feb. 21, 1963, 6,944/63
4 Claims. (Cl. 178—88)

ABSTRACT OF THE DISCLOSURE

Telegraph receiving apparatus including independent demodulators for "MARK" and "SPACE" channels each demodulator being responsive to a repetitive input signal capable of having either of two levels whose relative and absolute values are liable to variation and including a comparator circuit arranged to receive as separate input signals the instantaneous level of the received signal and a judgement level which lies approximately half way between the level of the maximum and minimum values of the input signal, the comparator circuit being arranged to give an output indicating which of the instantaneous or judgement levels is the greater, the "MARK" and "SPACE" channel demodulators each being associated with a common clamping circuit arranged to prevent the judgement level for either demodulator from rising above a level corresponding to a predetermined fraction of the highest instantaneous signal level obtaining in either channel.

---

Figure 1:
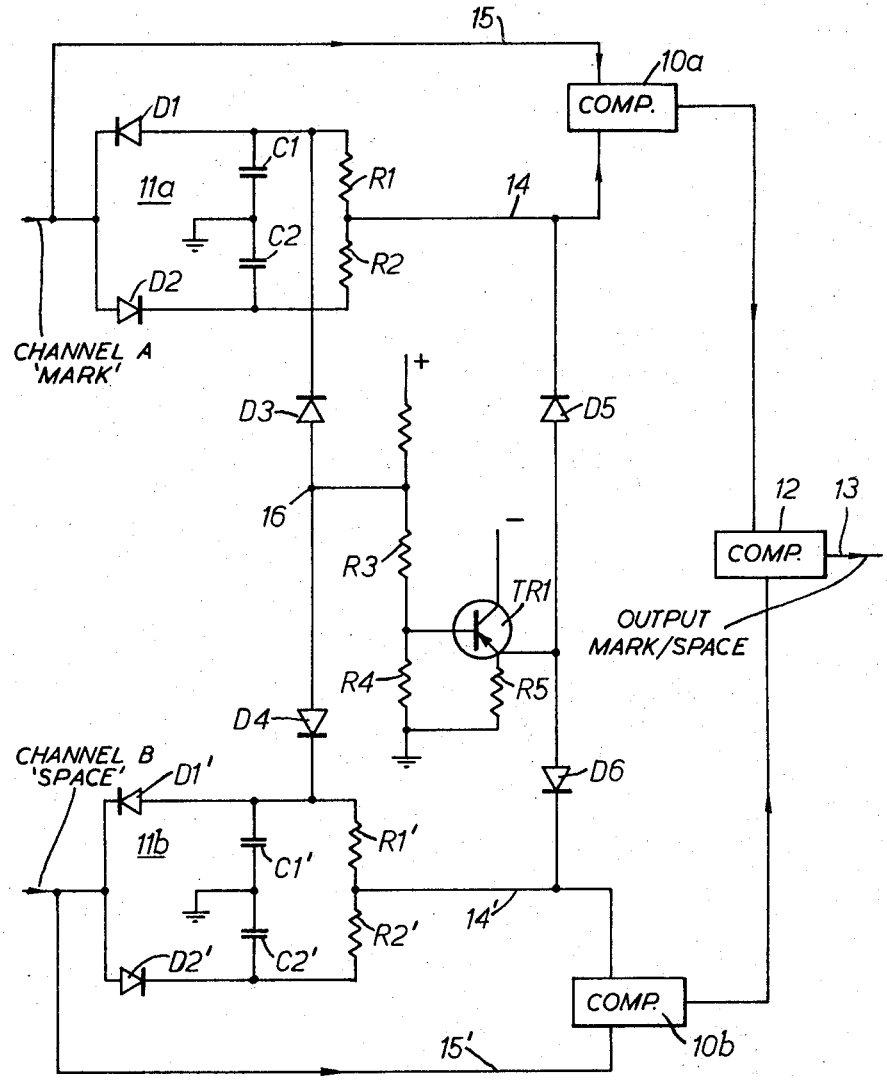

This invention relates to demodulators for telegraph signals of the kind in which the information content of the input signal to the demodulator is represented by one of two alternative signal levels, corresponding to signal "ON" and signal "OFF" respectively. The information may be carried by one such signal only, but in telegraph systems of the kind to which the invention has particular application two signal channels known respectively as the "MARK" and "SPACE" channels are employed. Signal transmission in such a system may be for example by keyed carrier, by carrier frequency shift or by the keying of a carrier modulation tone.

The operation of such a system with a low error rate depends at least in part upon the ability of the demodulator to discriminate between the two significant levels of its input signal, and to allow for both relative and absolute variations in these levels resulting from fading in the transmission channel and from variations in the noise content of the received signal.

According therefore to the invention, a telegraph demodulator responsive to a repetitive input signal capable of having either of two levels whose relative and absolute values are liable to variation includes a comparator circuit arranged to receive as separate input signals the instantaneous level of the received signal and a judgement level which is or which tends to be half-way between the levels of the maximum and minimum values of the input signal, the comparator circuit being arranged to give an output indicating which of the instantaneous or judgement levels is the greater.

According to another feature of the invention the demodulator includes also a clamping circuit arranged to prevent the judgement level from rising, when the signal remains continuously at its higher level, above a level corresponding to a predetermined fraction of the signal level. This feature enables the demodulator to allow for conditions, such as may occur if a channel remains continuously "ON" or "OFF" during a "stand-by" period.

According to a further feature of the invention, telegraph receiving apparatus includes independent demodulators each as defined in the next paragraph for "MARK" and "SPACE" channels, the demodulators being associated with a common clamping circuit arranged to prevent the judgement level for either demodulation from rising above a level corresponding to a predetermined fraction of the highest instantaneous signal level obtained in either channel.

The term telegraph demodulator or demodulator as used herein means a circuit arrangement to which the "MARK" signal channel or the "SPACE" signal channel of the telegraph signal is applied and which in the first case provides an output indicative of the presence or absence of a "MARK" signal and which in the second case provides an output indicative of the presence or absence of a "SPACE" signal. Some exemplary embodiments of the invention will now be described with reference to the accompanying drawings in which FIGURE 1 is a circuit diagram of a telegraph demodulator system, and FIGURE 2 is a circuit diagram of an alternative form of a telegraph demodulator system.

Figure 2:
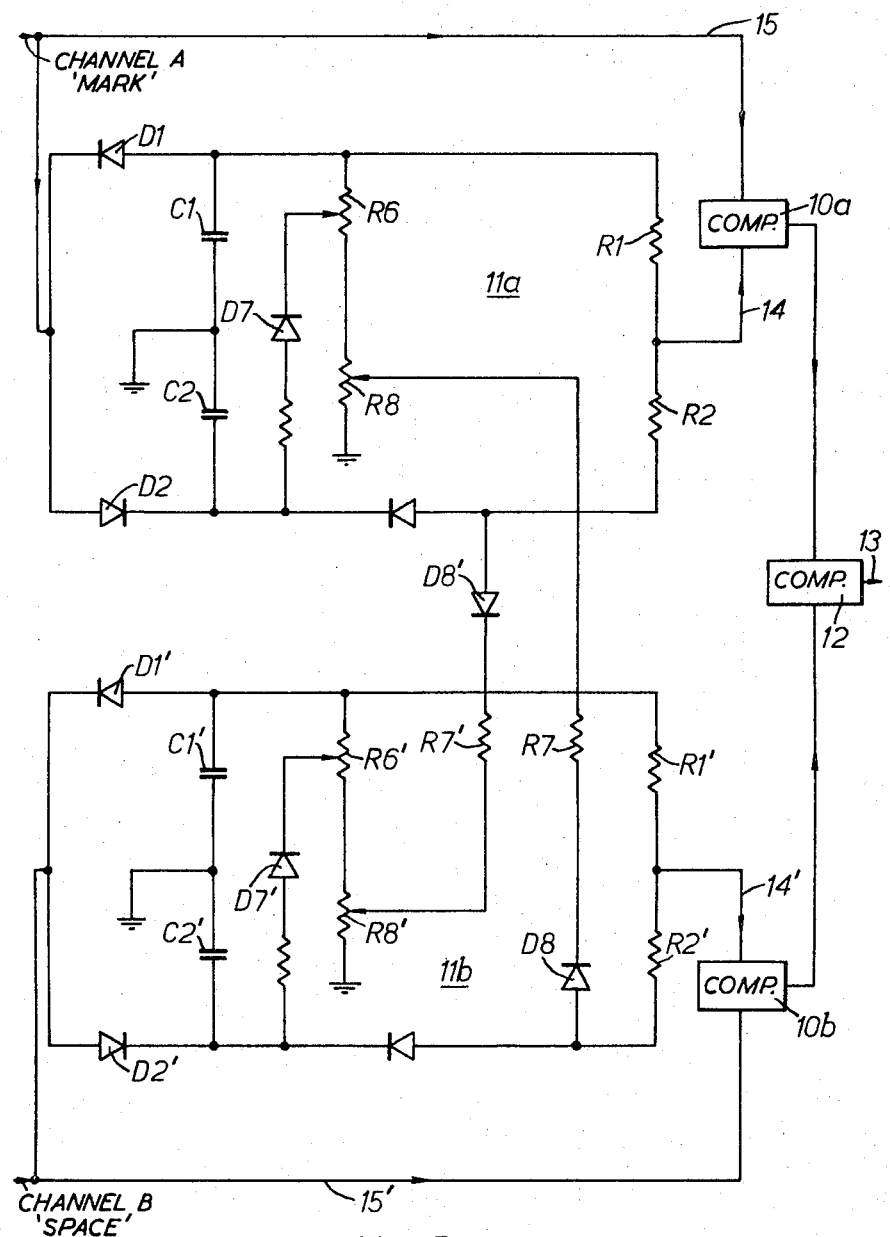

FIGURE 1 of the drawings represents the demodulator of a single information channel which at the demodulator input comprises a "MARK" channel A and a complementary "SPACE" channel B. These may be considered as the two sideband channels of a two-tone or frequency-shift system rectified before presentation to the modulator, so that the demodulator inputs consist of varying unipolar signals whose interpretation is "ON" or "OFF" if their level is respectively greater or lesser than some datum level.

The inputs will contain randomly varying noise components occupying substantially the same bandwidth as the wanted signal, since both have been passed through the same channel filters. In addition the varying input voltages may be "carried" on a fixed bias voltage introduced to enable the channel amplifiers (omitted from the drawings) to operate on a linear portion of their characteristic.

Each channel demodulator has therefore to determine whether the instantaneous value of its input signal represents "ON" or "OFF," and to perform this judgement while the two corresponding signal levels vary quite widely. This is accomplished by comparator circuits 10a and 10b, which compare the instantaneous values of the channel inputs with judgement levels obtained from judgement circuits 11a and 11b and provide outputs which correspond in sign or phase to the result—"ON" or "OFF"—of the level judgement and in amplitude to the weight attaching to this result. A further similar comparator 12 combines the two judgement out-puts to give an output 13 which represents an interpretation—"MARK" or "SPACE"—of the information channel weighted to allow for the prevailing levels and signal-to-noise ratios of the two sideband channels. A further similar comparison can be made between the outputs of two or more information channels in space or frequency diversity.

The two judgement circuits 11a and 11b are identical and conveniently the component parts thereof bear similar numerical designations, "SPACE" channel designations being dashed to differentiate from the "MARK" channel designations. It is assumed that the channel inputs are always negative with respect to earth, and that in each channel the greater signal amplitude corresponds to the channel "ON" condition.

Consider an instant at which the input signal to a channel A reaches a maximum (negative) excursion with respect to earth. The capacitor C1 will be charged through diode D1, assumed to have negligible forward resistance, to this peak signal value. It will tend to share its charge with the second capacitor C2 through the two equal resistors R1 and R2, chosen so that the circuit time constant is long compared with the duration of a signal element. C2 will therefore tend slowly to follow C1 up in charge until it too is charged to the maximum negative peak voltage. Now assume that the input signal adopts a second and lower value with respect to earth. The charge in capacitor C1 is held by the diode D1, but that in capacitor C2 is discharged through diode D2 until the voltage across C2 is equal to the new lower value of the input signal. Thus for inputs which have roughly equal total "ON" and "OFF" periods capacitor C1 will be charged to a voltage equal to the maximum signal voltage excursion from earth potential and C2 to a voltage corresponding to the minimum excursion. The line 14 connected to the common connection of R1 and R2 has therefore a potential midway between these maximum and minimum voltage excursions; under normal modulation conditions this is the required judgement level with which the instantaneous value of the input signal transmitted over line 15 is compared in the comparator 10a.

Consider next the conditions arising when the channel A input signals remain unchanged for a relatively long period of time. These conditions may arise when the information channel as a whole is in a "stand-by" condition. Alternatively they may result from periods of modulation in which the ratio of "ON" to "OFF" elements departs greatly from unity.

It will be seen that if channel A, for example, is held continuously in the "ON" condition, both its capacitors C1 and C2 will tend to charge up to the prevailing signal level. The judgement level represented by the potential on line 14 will also tend to approach the signal level; an accurate assessment of signal state by the comparator 10a therefore becomes impossible, since small random variations in the noise components of the input signal will cause the signal level to traverse the judgement level and yield spurious outputs. To overcome this, the "maximum excursion" voltage developed across the capacitors C1 and C1' for the two channels respectively is applied through diodes D3 and D4 to a common point 16, so that the potential at the point 16 is equal to the greater of the voltages appearing across the two channel capacitors C1 and C1'. This potential is divided by some suitable factor, preferably to 50% of its original value, by a voltage divider network consisting of resistors R3 and R4 connected between the point 16 and earth. The common connection of these two resistors forms the input to the base of a transistor TR1 (which operates as an emitter follower) whose emitter forms a low-impedance voltage reference point.

Two further diodes D5 and D6 tie the two judgement lines 14 and 14' to the collector of TR1. Thus the judgement level on each of the lines 14 and 14' cannot rise to a value greater than 50% of the maximum signal excursion on either channel A or channel B, whichever is the greater. Thus under stand-by conditions with one channel permanently "ON," the "ON" channel affords a firm interpretation through its comparator 10 of its condition. The complementary channel, in the "OFF" condition, will give an ambiguous output, since its judgement level is not restricted from falling to the prevailing noise level and small noise variations will therefore tend to give spurious outputs in this channel. The output of the channel is however of low amplitude and will be outweighed in the comparator 12 by the output from the "ON" channel.

As mentioned earlier in the specification, the varying channel input signals may be carried on a "pedestal" voltage whose function is the biasing of channel amplifiers and other circuits to linear portions of their characteristics. The presence of this biasing voltage does not affect the operation of the demodulator except in that the reference point for the clamping diodes D5 and D6, that is to say the point to which the resistor R4 and the collector load R5 of transistor TR1 are returned has to be raised to a corresponding potential to avoid an inaccurate assessment of judgement level.

FIGURE 2 of the drawings shows an alternative circuit arrangement for the demodulator. Circuit elements corresponding to elements of the circuit shown in FIGURE 1 have been given corresponding reference numerals; the operation of the corresponding elements of the two circuits is similar and a detailed description of these portions of the FIGURE 2 circuit is therefore unnecessary.

Consider long signal "ON" conditions in channel A, for the arrangement of FIGURE 2. Capacitor C1 tends to charge up to the maximum excursion voltage, negative with respect to earth, but capacitor C2 can charge only to the potential applied to it from the slider of R6 through diode D7. The potential across C2 will therefore be held at a given fraction of the signal across C1. The judgement level will be halfway between these two values and will always be lower than the potential across C1, the comparator interpretation of a channel "ON" condition is therefore.

Under long signal "OFF" conditions in channel A, the potential across capacitor C1, falls to the minimum excursion value with respect to earth of the input signal. This establishes the potential of one end of the judgement voltage divider network chain. The other end of the voltage divider network chain, represented by the lower end of resistor R2, is however restrained from following the top end of resistor R1 down in potential by a negative potential applied to the lower end of resistor R2 through diode D8' which is connected through a load R7' to the slider of a potentiometer R8' in the complementary channel of the modulator. The negative potential applied over D8' to channel A which is in the "OFF" condition is therefore a proportion of the signal level in the complementary "ON" channel B. The potentiometer R8' is adjusted so that this potential is greater by an appreciable margin than the potential developed across capacitor C1 in the "OFF" channel A. The judgement level represented by the potential of a common connection of resistors R1 and R2 or resistors R1' and R2' will therefore always be greater than the prevailing signal level in the channel which is in the "OFF" condition, and will therefore afford a definite indication of channel "OFF" condition.

Under such conditions the clamping potential applied over diode D8 or D8' as the case may be to the "OFF" channel may be obtained from a fixed potential source instead of potentiometer R8 or R8' in the complementary channel. However under certain conditions, such as diversity reception, the system automatic gain control will cause variations of the gain in each individual channel which with a fixed clamping potential would render the operation of the circuit uncertain.

It will be seen that with the arrangement of FIGURE 2 both "MARK" and "SPACE" channels afford correct signal outputs under long-signal conditions: this represents a reduction in error probability compared with the circuit of FIGURE 1 at the cost of an increase in circuit complexity. The circuit of FIGURE 2 is also adjustable, by the resistors R6 and R8 in channel B and R6' and R8' in channel A, to cater for variations in day-to-day service conditions. To allow the judgement circuits the greatest freedom of operation under normal modulation conditions the sliders of these two resistors in each channel should be set as near to the upper and lower limits respectively of their travel as is possible without causing spurious outputs under long-signal conditions.

In these demodulators, the maximum possible modulation rate is controlled by the bandwidth in the preceding sections of the apparatus. However in general the bandwidth in cycles per second will be somewhat greater than the modulation rate in bauds, depending on the frequency stability that can be assumed. It may therefore be advantageous to provide a low-pass filter in the "signal" path of the demodulator to compensate for the greater bandwidth of the preceding circuits. This filter may consist of a simple resistance-capacitance section, but a filter with a more closely-controlled characteristic would be advantageous in dealing with certain kinds of noise that result in spurious modulation signals just above the band speed of the transmission.

A resistance may be included in series with each of the judgement circuit diodes D1 and D2 or D1' and D2'; that in series with D1 or D1' safeguards the diode by limiting the charging current of C1 or C1', while that in series with D2 or D2' increases the time constant of the circuit and provides a measure of low-pass filtering.

Judgement circuits such as 11a and 11b may be employed individually in apparatus employing a single information channel, reference and clamping potentials for the judgement levels being obtained from fixed sources.

What we claim is:

1. Telegraph receiving apparatus including independent demodulators for "MARK" and "SPACE" channels each demodulator being responsive to a separate repetitive input signal capable of having either of two levels whose relative and absolute values are liable to variation and each demodulator including judgement level producing means for producing in dependence upon the said input signal a judgement level which lies approximately half way between the two levels of the input signal and each demodulator including a comparator circuit arranged to receive as separate input signals the instantaneous level of the received signal and the judgement level, the comparator circuit being arranged to give an output indicating which of the instantaneous or judgement levels is the greater, a common clamping circuit associated with each of the "MARK" and "SPACE" channel demodulators and arranged to prevent the judgement level of either demodulator from rising above a level corresponding to a predetermined fraction of the highest instantaneous signal level obtaining in either channel.

2. Telegraph receiving apparatus including independent demodulators for "MARK" and "SPACE" channels each demodulator being responsive to a repetitive input signal capable of having either of two levels whose relative and absolute values are liable to variation and including judgement level producing means for producing a judgement level which lies approximately half way between the two levels of the input signal and a comparator circuit arranged to receive as separate input signals the instantaneous level of the received signal and the judgement level, the comparator circuit being arranged to give an output indicating which of the instantaneous or judgement levels is the greater, a common clamping circuit associated with each of the "MARK" and "SPACE" channel demodulators and arranged to prevent the judgement level of either demodulator from rising above a level corresponding to a predetermined fraction of the highest instantaneous signal level obtaining in either channel, the common clamping circuit comprising a first common point connected via respective diodes to the demodulators such that the first common point is at a potential equal to the potential corresponding to the highest instantaneous signal in the demodulators, the first common point being connected via a voltage divider network and a transistor to a second common point, the voltage divider network and transistor being so arranged that the second common point forms a low impedance voltage reference point at a potential which is a predetermined fraction of the potential at the first common point, and the second common point being connected via respective diodes to judgement level comparator input lines whereby the judgement level signals of both demodulators are clamped to prevent their rising above the potential at the second common point.

3. Telegraph receiving apparatus including independent demodulators for "MARK" and "SPACE" channels each demodulator being responsive to a repetitive input signal capable of having either of two levels whose relative and absolute values are liable to variation and including judgement level producing means for producing a judgement level which lies approximately half way between the two levels of the input signal and a comparator circuit arranged to receive as separate input signals the instantaneous level of the received signal and the judgement level, the comparator circuit being arranged to give an output indicating which of the instantaneous or judgement levels is the greater, a common clamping circuit associated with each of the "MARK" and "SPACE" channel demodulators and arranged to prevent the judgement level of either demodulator from rising above a level corresponding to a predetermined fraction of the highest instantaneous signal level obtaining in either channel, the common clamping circuit comprising a first diode and resistor means in each demodulator for partially isolating points corresponding to highest and lowest instantaneous signal level therein to prevent either of the judgement levels from rising when either of the signals remain continuously at its high level, above a level corersponding to a predetermined fraction of the corresponding higher signal level, and two separate second diode and resistor means respectively connected between the point corresponding to the higher instantaneous signal in one demodulator and the point corresponding to the lower instantaneous signal in the other demodulator, the second diode and resistor means being arranged to prevent either of the judgement levels from falling, when either of the signals remains continuously at its lower level, below a level corresponding to substantially 50% of the higher signal level of the other demodulator.

4. Telegraph receiving apparatus as claimed in claim 3 wherein at least one of the resistors of the first and second diode and resistor means is a variable resistor.

References Cited

UNITED STATES PATENTS

| | | | |
|---|---|---|---|
| 2,879,411 | 3/1959 | Faulkner | 328—146 X |
| 3,130,324 | 4/1964 | Swallow | 328—146 X |
| 3,173,095 | 3/1965 | Wagner | 307—88.5 X |
| 3,238,299 | 2/1966 | Lender | 178—68 |

ROBERT L. GRIFFIN, *Primary Examiner.*

W. S. FROMMER, *Assistant Examiner.*